A. F. HANSEN.
RIM COMPRESSOR.
APPLICATION FILED OCT. 7, 1907.

914,949.

Patented Mar. 9, 1909.

Witnesses

Inventor
Albert F. Hansen
by Attorneys

UNITED STATES PATENT OFFICE.

ALBERT F. HANSEN, OF HOLLIS, OKLAHOMA.

RIM-COMPRESSOR.

No. 914,949.

Specification of Letters Patent.

Patented March 9, 1909.

Application filed October 7, 1907. Serial No. 396,312.

*To all whom it may concern:*

Be it known that I, ALBERT F. HANSEN, a citizen of the United States, residing at Hollis, in the county of Greer and State of Oklahoma, have invented certain new and useful Improvements in Rim-Compressors; and I do declare the following to be a full, clear, and exact description of the invention, such as will enable others skilled in the art to which it appertains to make and use the same.

My invention relates to new and useful improvements in devices for preventing the dishing of vehicle wheels, while tightening the tires.

Said invention has for its object to provide for readily and effectively carrying out the aforesaid purpose, in a simple and expeditious manner and with facility.

It consists of certain instrumentalities of features substantially as hereinafter disclosed and defined by the claims.

Figure 1:
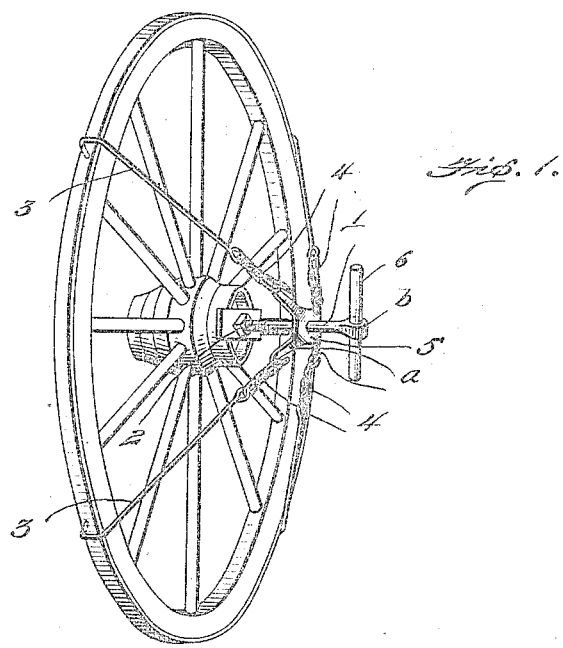
Figure 2:
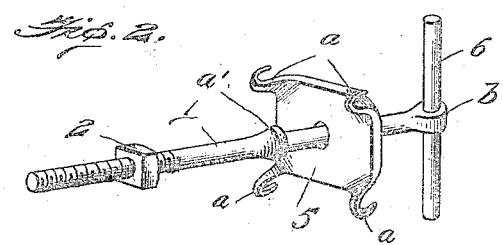

In the accompanying drawings: Figure 1 is a perspective view showing the application of my invention for actual use; and Fig. 2 is a disassembled perspective view of the central straining rod.

In practicing my invention, I employ what may be termed a central stressing rod, 1, with a screw threaded portion engaged by a nut, 2, having suitable bearings upon the hub of a wheel, said stressing rod being arranged in alinement with and extending into the bore of the hub.

A series or plurality of links or rods, 3, have their hooked ends adapted to be caught over the rim of the wheel and their inner ends formed into eyes or loops having preferably short chain-connections, 4, with the hooked arms $a$ of a plate or washer, 5, slidably arranged upon said stressing rod and bearing upon a shoulder $a^1$ thereon, the outer end of said stressing rod being eye-ended as at $b$. The chains 4 provide a flexible connection for the links 3 with the plate 5 and permit a partial turning of the plate without twisting of the links; they also provide for the quick adjustment of the links to fit wheels of different sizes and for the detachable connection of these members for shipping and storing.

A hand or spike bar, 6, by the suitable actuation of which, after having been inserted through the eye-ended portion of said stressing rod, has the effect to put the aforesaid link rods and chains under stress or tension, whereby the wheel will be firmly braced, as against being deflected out of its initial form or being dished as in performing the tire tightening operation, as will be readily understood by those conversant with this art.

It is apparent that this device is simple, effective in operation and may be readily contrived for its intended purpose, as well as being inexpensive in manufacture.

It will be understood that various changes as relates to the details of construction and arrangement of the parts above described may be adopted without departing from the spirit of my invention, as embraced in the following claims.

Having thus described the nature of my invention, what I claim as new and desire to secure by Letters-Patent, is:

1. In a rim compressor, the combination of a stressing rod having one end screw threaded and a handle member at its other end with an annular shoulder formed intermediately of its ends, a hub engaging member in threaded engagement with the threaded end of the stressing rod, an apertured plate freely slidable on said rod between said shoulder and said handle, the aperture in said plate being of greater diameter than said rod, arms extending laterally from said plate, rim engaging means and flexible means detachably connecting said rim engaging means with the arms of said plate.

2. In a rim compressor, the combination of a stressing rod having one end screw threaded and a handle member at its other end, an annular shoulder formed intermediately of the ends of said rod, a hub engaging member in threaded engagement with the threaded end of the stressing rod, an apertured plate freely slidable on said rod between said shoulder and said handle-carrying end, the aperture in said plate being of greater diameter than said rod, said plate having laterally extending arms provided at their free ends with hooks, links having rim engaging means at one end and chains connecting the other ends of said links with the hook ends of said plate, arms whereby said links may be quickly adjusted to fit wheels of different sizes.

3. In a rim compressor, the combination of a stressing rod having one end screw threaded with a nut-like member operable on said screw threaded end and adapted to bear on the wheel hub, said rod having a laterally projecting member fixed thereto intermediately of its ends, a plate mounted to move freely on said rod and bear on said laterally projecting member, links having means at one end for engagement with a wheeled rim, means for detachably connecting the other
5 end of said links with said plate, and means for actuating said rod.

In testimony whereof I have hereunto set my hand in presence of two subscribing witnesses.

ALBERT F. HANSEN

Witnesses:
  STERLING ABERNETHY,
  MARY P. BARNETT.